US012412253B2

(12) United States Patent
Santhar et al.

(10) Patent No.: US 12,412,253 B2
(45) Date of Patent: Sep. 9, 2025

(54) CONTEXTUAL PRIORITY BASED MULTIMEDIA MODIFICATION

(71) Applicant: International Business Machines Corporation, Armonk, NY (US)

(72) Inventors: Sathya Santhar, Ramapuram (IN); Sarbajit K. Rakshit, Kolkata (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 17/567,927

(22) Filed: Jan. 4, 2022

(65) Prior Publication Data
US 2023/0214966 A1    Jul. 6, 2023

(51) Int. Cl.
*G06T 5/77*  (2024.01)
*G06N 3/045* (2023.01)
(Continued)

(52) U.S. Cl.
CPC .............. *G06T 5/77* (2024.01); *G06N 3/045* (2023.01); *G06V 10/764* (2022.01); *G06V 20/20* (2022.01);
(Continued)

(58) Field of Classification Search
CPC ........... G06T 5/005; G06T 2207/10016; G06T 2207/20084; G06N 3/045; G06N 3/047;
(Continued)

(56) References Cited

U.S. PATENT DOCUMENTS

| 11,551,444 B2* | 1/2023 | Gibbon ..................... G06T 7/70 |
| 2018/0089506 A1 | 3/2018 | Taite |
| 2018/0160100 A1 | 6/2018 | Konttori |

(Continued)

FOREIGN PATENT DOCUMENTS

| WO | 2012082444 A1 | 6/2012 | |
| WO | WO-2023022373 A1 * | 2/2023 | ............. G06T 13/20 |

OTHER PUBLICATIONS

"Profile Development to Predict Content Adaptations", An IP.com Prior Art Database Technical Disclosure, Authors et. al.: Disclosed Anonymously, IP.com No. IPCOM000265736D, IP.com Electronic Publication Date: May 11, 2021, 5 pages.
(Continued)

*Primary Examiner* — Devona E Faulk
*Assistant Examiner* — Donna J. Ricks
(74) *Attorney, Agent, or Firm* — Edward Wixted; Andrew D. Wright; Calderon Safran & Wright P.C.

(57) ABSTRACT

A computer-implemented method for multimedia modification is disclosed. The computer-implemented method includes classifying one or more objects detected within a user's field of view through an augmented reality environment. The computer-implemented method further includes determining a context of the user based, at least in part, on the one or more classified objects detected within the user's field of view. The computer-implemented method further includes generating a priority score for the one or more classified objects based, at least in part, on the context of the user. The computer-implemented method further includes modifying an object detected within the user's field of view based, at least in part, on the priority score of the object.

20 Claims, 5 Drawing Sheets

(51) Int. Cl.
*G06V 10/764* (2022.01)
*G06V 20/20* (2022.01)

(52) U.S. Cl.
CPC .............. *G06T 2207/10016* (2013.01); *G06T 2207/20084* (2013.01)

(58) Field of Classification Search
CPC ........ G06N 3/088; G06N 7/01; G06V 10/764; G06V 20/20
See application file for complete search history.

(56) References Cited

U.S. PATENT DOCUMENTS

| | | | |
|---|---|---|---|
| 2019/0236759 A1* | 8/2019 | Lai .......................... | G06N 3/047 |
| 2019/0251401 A1* | 8/2019 | Shechtman ............ | G06V 10/82 |
| 2021/0377548 A1* | 12/2021 | Lakshmanan .......... | H04N 19/17 |

OTHER PUBLICATIONS

Lin et al., "ST-GAN: Spatial Transformer Generative Adversarial Networks for Image Compositing", arXiv:1803.01837v1 [cs.CV] Mar. 5, 2018, 13 pages.

Mell et al., "The NIST Definition of Cloud Computing", Recommendations of the National Institute of Standards and Technology, NIST Special Publication 800-145, Sep. 2011, 7 pages.

Redmon et al., "You Only Look Once: Unified, Real-Time Object Detection", arXiv:1506.02640v5 [cs.CV] May 9, 2016, 10 pages.

Sylvain et al., "Object-Centric Image Generation from Layouts", arXiv:2003.07449v2 [cs.CV] Dec. 3, 2020, 13 pages.

Zhu et al., "Moving Object Detection Based on Background Compensation and Deep Learning", Received: Nov. 3, 2020; Accepted: Nov. 23, 2020; Published: Nov. 27, 2020, Symmetry 2020, 12, 1965; doi:10.3390/sym12121965, 17 pages.

* cited by examiner

CONTEXTUAL PRIORITY BASED MULTIMEDIA MODIFICATION

BACKGROUND

The present invention relates generally to the field of video analysis, and more particularly to, contextual priority video analysis for generative adversarial network (GAN) based video modification.

Video content analysis or video content analytics, also known as video analysis or video analytics, is the automatic analysis of videos to detect and determine temporal and spatial events. Video motion analysis is a technique used to obtain information about moving objects from video. Object detection is a computer technology related to computer vision and image processing that deals with detecting the location of objects of a certain class in digital images and videos. Object detection includes classification and regression based algorithms. Classification based algorithms include selecting a particular region from the image, and then classifying the region using convolutional neural networks, such as region-based convolutional neural networks (RCNN), Fast-RCNN, and Faster-RCNN. Regression based algorithms include generating classes and bounding boxes for the whole image, such as You Only Look Once (YOLO).

A GAN (Generative Adversarial Network) is a supervised learning problem with two sub-models known as the generator model and the discriminator model. A generator model is trained to re-create and generate the detected objects in the given input surrounding with a better visibility and reality. A discriminator model is trained to classify the objects as either real (from the domain) or fake (generated). It is provided with ground truth images of the objects during training so that it can differentiate the real from the fake ones. The two models are trained together in a zero-sum game, adversarial, until the discriminator model is fooled about half the time, meaning the generator model is generating plausible objects.

SUMMARY

According to one embodiment of the present invention, a computer-implemented method for multimedia modification is disclosed. The computer-implemented method includes classifying one or more objects detected within a user's field of view through an augmented reality environment. The computer-implemented method further includes determining a context of the user based, at least in part, on the one or more classified objects detected within the user's field of view. The computer-implemented method further includes generating a priority score for the one or more classified objects based, at least in part, on the context of the user. The computer-implemented method further includes modifying an object detected within the user's field of view based, at least in part, on the priority score of the object.

According to another embodiment of the present invention, a computer program product for multimedia modification is disclosed. The computer program product includes one or more computer readable storage media and program instructions stored on the one or more computer readable storage media. The program instructions include instructions to classify one or more objects detected within a user's field of view through an augmented reality environment. The program instructions further include instructions to determine a context of the user based, at least in part, on the one or more classified objects detected within the user's field of view. The program instructions further include instructions to generate a priority score for the one or more classified objects based, at least in part, on the context of the user. The program instructions further include instructions to modify an object detected within the user's field of view based, at least in part, on the priority score of the object.

According to another embodiment of the present invention, a computer system for multimedia modification is disclosed. The computer system includes one or more computer processors, one or more computer readable storage media, and computer program instructions, the computer program instructions being stored on the one or more computer readable storage media for execution by the one or more computer processors. The program instructions include instructions to classify one or more objects detected within a user's field of view through an augmented reality environment. The program instructions further include instructions to determine a context of the user based, at least in part, on the one or more classified objects detected within the user's field of view. The program instructions further include instructions to generate a priority score for the one or more classified objects based, at least in part, on the context of the user. The program instructions further include instructions to modify an object detected within the user's field of view based, at least in part, on the priority score of the object.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
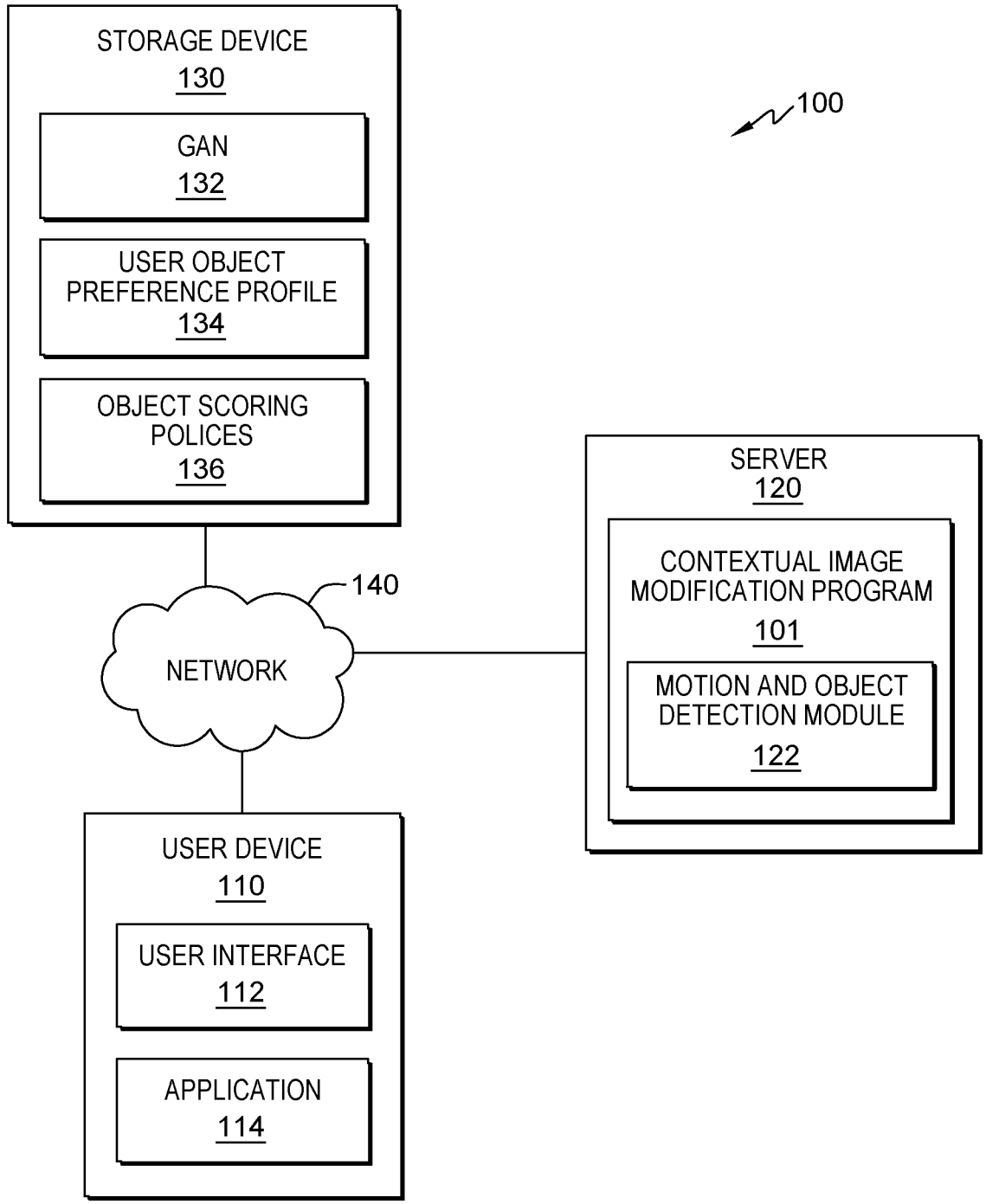
FIG. 1 is a block diagram of a network computing environment for a contextual image modification program 101, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of video analysis, and more particularly to, contextual priority video analysis for generative adversarial network (GAN) based video modification.

Oftentimes, the terms image classification and object detection are used interchangeably. However, these two image analysis algorithms have quite different purposes. In general, image classification is used to classify an image as pertaining to a particular category, while object detection is used to identify the location of a particular object within an image. Although image classification and object detection are used for different purposes, there is some overlap between the two. For example, when there are crowded or overlapping objects in an image or video, a person might be interested in seeing only one object of particular interest to the viewer. Similarly, there may be instances where a person is not interested in seeing an object of particular disinterest to the viewer. In some cases, the object or the characteristics that are required to be seen by the user might be too small with respect to the full image. In these situations, a better performance is achieved with object detection instead of image classification even if the viewer is not interested in identifying the exact location or number of instances of an object.

Embodiments of the present invention recognize that while performing an activity, the visual surrounding of a person can be of utmost importance. For a particular contextual situation, different objects in the surrounding area of a person may be more or less important. However, as the contextual situation of the person changes, so too may the location or position of objects relative to the person's environment. However, as the location or position of objects relative to the person's environment changes, the particular objects of interest or having priority over other objects may become blocked by other objects, which ultimately may inhibit a person from properly or safely performing a given task. The overlapping of objects in a digital image or video frame is referred to as occlusions. Occlusions caused by objects of the same class is called intra-class occlusion, also referred to as crowd occlusion.

Current image analysis algorithms focus on detecting static or moving overlapping objects and generating images using a GAN by removing occlusions. However, embodiments of the present invention recognize different objects may have different priority levels to the viewer based on the context of the viewer. In different contexts, different object in the surrounding environment of the user may get prioritized, and based on a change in the context, the priority of the object can also be changed. For example, a user's AR glasses in different contexts such as for work, shopping, and entertainment with the same objects having different priority based on the context of the user wearing the AR glasses. Further, a person may be interested in only seeing part of a digital image or video. For example, when watching a movie, one user may enjoy seeing a ghost in a scene while another user may not.

Embodiments of the present invention advantageously provide for an improved image analysis algorithm that contextually prioritizes objects in a digital image or video based on the context of a person. According to an embodiment of the present invention, an artificial intelligence (AI) system is employed to analyze the contextual situation of a digital image, video, augmented reality environment, and or virtual reality environment to generate a priority score for one or more detected objects. In an embodiment, detected objects in person's field of view are assigned a priority rating or score based on the context the person and registered priority data associated with a particular person. In an embodiment, a priority score for an object is generated based, at least in part, on one or more of the relative position of an individual with respect to different objects in the person's field of view, the types of objects in the person's field of view, the relative direction of movement with respect to different objects in the person's field of view, a person's visual focus with respect to objects in the person's field of view, a degree of visibility of objects within a person's field of view. In an embodiment, the priority score of an object is recalculated based on one or more identified precautions taken by an individual while engaged in a particular contextual situation. For example, if a person is taking something out of the oven and they are wearing oven mitts. Embodiments of the present invention further advantageously utilize a GAN to modify an object based on one or more registered user preferences if a priority score of an object is either below a predetermined threshold or above a predetermined threshold.

In an embodiment, if a detected object has a priority score above a predetermined threshold, a GAN is used to modify the object having the priority score above a predetermined threshold. For example, if a detected object is not clearly visible to a person present within a particular contextual environment (e.g., a person is working in a machine shop and there is high speed rotating chain that is not clearly visible when moving at such high speeds), and the detected object has a priority score above a predetermined threshold, a GAN is used to display a modified object via augmented reality (AR) glasses so that the individual can clearly visualize the object.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment suitable for a contextual image modification program 101, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR glasses, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., augmented reality (AR) application, virtual reality (VR) application, streaming application, multimedia application) located on user device 110. In various example embodiments, application 114 can be an application that a user of user device 110 utilizes to view objects in real-time. In various example embodiments, application 114 can be an application that displays multimedia such as images, videos, and recordings. In an embodiment, application 114 can be a client-side application associated with a server-side application running on server 120 (e.g., a client-side application associated with contextual image modification program 101). In an embodiment, application 114 can operate to perform processing steps of contextual image modification program 101 (i.e., application 114 can be representative of contextual image modification program 101 operating on user device 110).

Server 120 is configured to provide resources to various computing devices, such as user device 110, For example, server 120 may host various resources, such as motion and object detection module 122 that are accessed and utilized by a plurality of devices participating in contextual priority image modification. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes contextual image modification program 101, which further includes motion and object detection module 122. In an embodiment, motion and object detection module 122 is a computer algorithm used to determine the motion, distance, and type of object within a field of view of a person. For example, motion and object detection module 122 determines there is a spinning wheel 5 feet away from the user. In an embodiment, motion and object detection module 122 detects moving objects with compensation and deep learning. In an embodiment, a convolutional neural network based method (YOLOx3-SOD) is employed to detect all objects in an image or field of view of a person, by fusing the results obtained by motion detection and object detection.

In an embodiment, contextual image modification program 101 may be configured to access various data sources, such as a trained GAN 132, user object preference profile 134, and object scoring policies 136, which may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, contextual image modification program 101 enables the authorized and secure processing of personal data. In an embodiment, contextual image modification program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, contextual image modification program 101 provides information regarding personal data and the nature (e.g., type, scope, purpose, duration, etc.) of the processing. In an embodiment, contextual image modification program 101 provides a user with copies of stored personal data. In an embodiment, contextual image modification program 101 allows for the correction or completion of incorrect or incomplete personal data. In an embodiment, contextual image modification program 101 allows for the immediate deletion of personal data.

Figure 3:
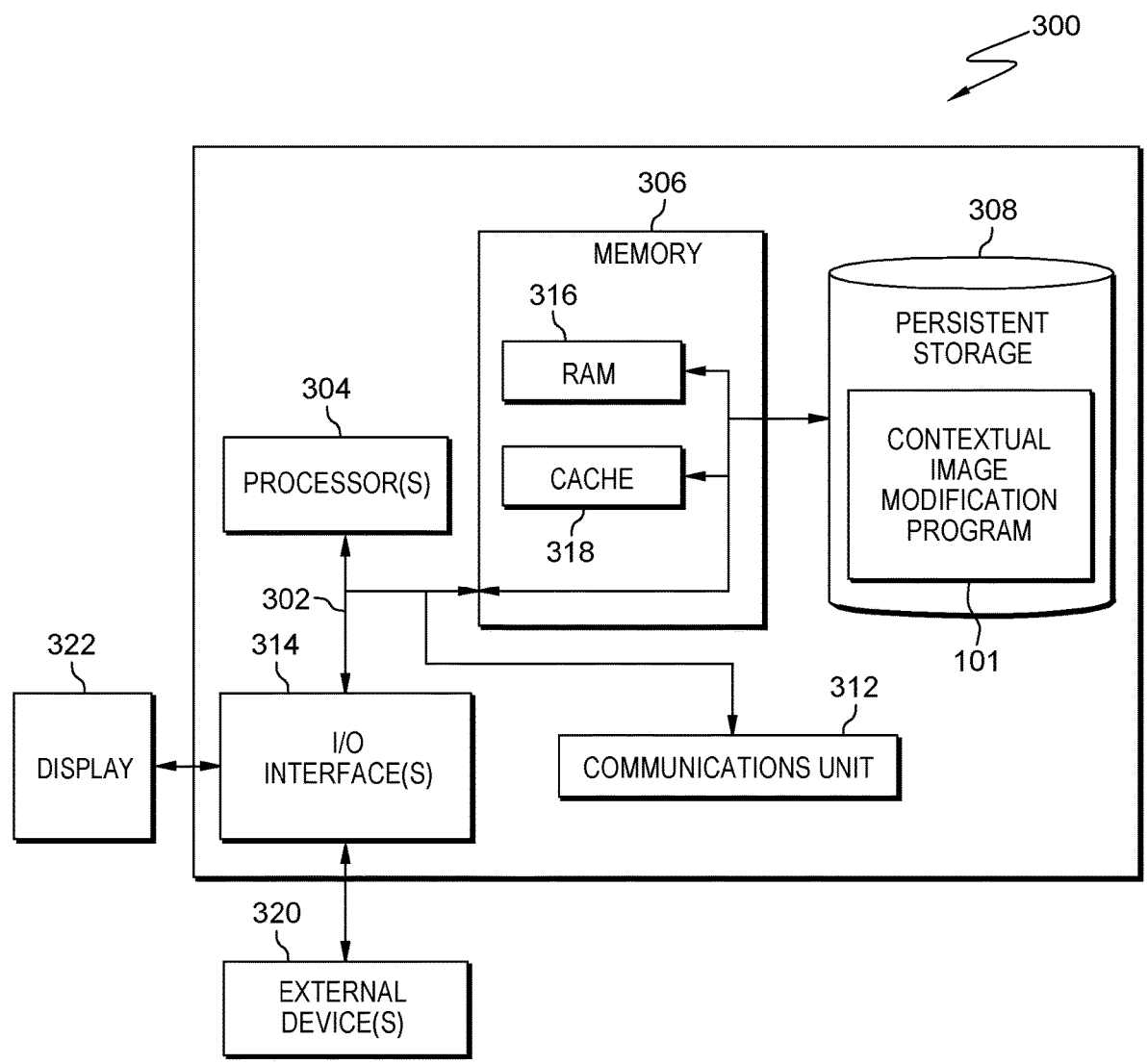
FIG. 3 is a block diagram depicting components of a computer, generally designated 300, suitable for executing a contextual image modification program 101, in accordance with at least one embodiment of the present invention.
Figure 4:
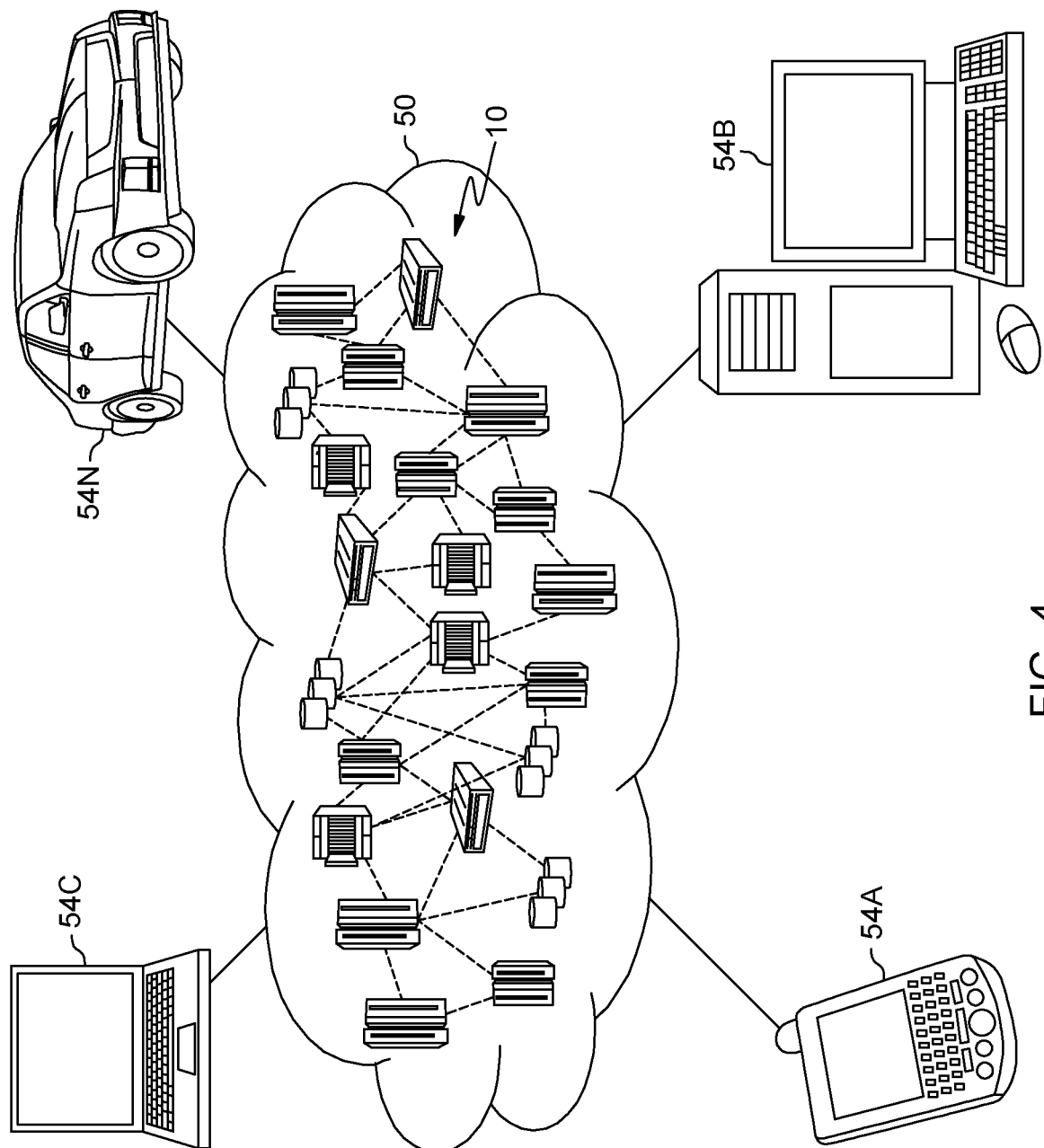
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for a trained GAN, user profile information, and policies utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes GAN 132, user object preference profile 134, and object scoring policies 136. In an embodiment, GAN 132 is utilized to regenerate one or more priority objects based on an objects priority score to provide a better visibility of the one or more priority objects. In an embodiment, GAN 132 is trained using previously classified or tagged objects associated with a particular class of objects. In an embodiment, GAN 132 is trained to re-create and generate the detected priority objects in a given contextual environment with improved visibility. In an embodiment, GAN 132 is trained to classify priority objects as either real (from the domain) or fake (generated). In an embodiment, GAN 132 is provided with ground truth images of priority objects during training in order to differentiate the real from the fake ones. In an embodiment, GAN 132 is trained in a zero-sum game, adversarial, until the discriminator model is fooled about half the time, meaning the generator model is generating plausible priority objects.

In an embodiment, user object preference profile 134 comprises information relating to the user, such as users occupation, profile, preferences, context, and similar. Profile comprises the users job role, specialization, historical preferences, and position to surrounding. Context comprises the circumstances that form the setting for an event, statement, or idea, and in terms of which it can be fully understood and assessed. In an embodiment, different users may be interested in viewing different objects even from the same view, video, or image. In an embodiment, contextual image modification program 101 accesses information in user object preference profile 134 to determine one or more users preferences and analyzes the context of the surroundings in the user's view, video, or image. In an example, during an operation a cardiologist is highly interested in the heart as a priority object while the anesthesiologist is highly interested in the instruments displaying the vitals. In an embodiment, contextual image modification program 101 gathers information from user object preference profile 134 to generate a priority score for more or more objects in the user's field of view. For example, while cooking in the kitchen, a chef will have a high priority score for the food items and the dishwasher will have a high priority score for dishes and other cookware. In an embodiment, contextual image modification program 101 identifies one or more precautions taken by a user and generates a priority score of an object based on the precaution taken and stores this information in user object preference profile 134. For example, if user takes a precaution of wearing steal toe boots while on a construction site, contextual image modification program 101 generates a priority score based, at least in part, on the precaution and identified objects and stores this information in user object preference profile 134.

In an embodiment, object scoring policies 136 includes a dynamic set of rules for determining one or more priority objects based, at least in part, on user object preference profile 134. In an embodiment, object scoring policies 136 includes information describing different decision-making actions by contextual image modification program 101 depending on the particular contextual environment of the user, the particular objects and priority scores assigned to objects detected in the contextual environment, and information included in a user object preference profile 134. In an embodiment, a particular policy is selected based, at least in part, on matching one or more of the distances between the priority object and the user, the motion of the priority object, the precautions the user has taken, the users occupation, the users preferences, the type of priority object, and the priority object score to a policy.

In an embodiment, contextual image modification program 101 regenerates an image based, at least in part, on contextually prioritizing one or more objects. In an embodiment, contextual image modification program 101 receives user input for the user's profile. In an embodiment, the user input includes preferences, the user's occupation, context, profile, precautions, historical preferences, or other information related to the user. For example, contextual image modification program 101 receives user input that user A is a cardiologist. In another example, contextual image modification program 101 receives user input that user B does not prefer to see scary objects in a movie. In yet another example, contextual image modification program 101 receives user input that user C took the precaution of wearing metal gloves.

In an embodiment, contextual image modification program 101 identifies one or more objects in a person's field of view. In an embodiment, contextual image modification program 101 identifies one or more objects from a real-time image, video, AR environment or VR environment. In an embodiment, contextual image modification program 101 identifies and classifies one or more objects within the user's field of view through an augmented reality device using video content analysis, video content analytics, object analysis, or video motion analysis. For example, user A is wearing AR glasses and contextual image modification program 101 identifies and classifies an engine, transmission, and radiator from the real-time image data viewed through the AR glasses. In another example, user B is watching a movie and contextual image modification program 101 identifies a desk, a person, and a dog from the video frames of the movie.

In an embodiment, contextual image modification program 101 determines contextual data in relation to the one or more detected objects in a person's field of view. In an embodiment, contextual image modification program 101, determines a context of the user based, at least in part, on the one or more classified objects detected within the user's field of view In an embodiment, contextual image modification program 101 determines the context of the image, video, AR environment, or VR environment based on the one or more detected objects. In an embodiment, contextual image modification program 101 determines contextual data in relation to the one or more detected objects based, at least in part, on user profile information. For example, contextual image modification program 101 identifies the user, through their AR glasses, is viewing an engine, transmission, and radiator, and a user profile associated with the user includes information that the user is a mechanic, then contextual image modification program 101 determines the context is "user is looking under the hood of a car."

In an embodiment, contextual image modification program 101 determines contextual data of a person's field of view based, at least in part on, the position, direction, area, location, visibility, movement, activity area, other detected objects and location of where the user is focusing. For example, contextual image modification program 101 determines a dangerous context when the user is 6 inches away from a fast spinning wheel verses when the user is 16 feet away from the fast spinning wheel. In another example, contextual image modification program 101 determines the context to be a kitchen where the user is cooking based on the users location surroundings of an oven, dishwasher, sink and counter and the users eyes focusing on a bowl, mixing tool, flour, and eggs. In an embodiment, contextual image modification program 101 determines one or more priority objects. In the previous example, based on the location of where the user is focusing, contextual image modification program 101 determines the mixing tool and bowl with the ingredients are the priority objects.

In an embodiment, contextual image modification program 101 generates a priority score for the one or more detected objects within a person's field of view. In an embodiment, contextual image modification program 101 generates a priority score for the one or more classified objects based, at least in part, on the context of the user. In an embodiment, contextual image modification program 101 generates a priority score based, at least in part, on information included in a user profile associated with a particular person. For example, user profile includes historical preferences that a user is typically interested in the radiator wires when looking under the hood of a car. In this example, contextual image modification program 101 generates a higher priority score for the radiator wires than the engine when the user is looking under the hood of a car. In an embodiment, contextual image modification program 101 generates a priority score based on the dangers and precautions taken by the user. For example, contextual image modification program 101 determines the user is wearing protective eyewear as a precaution and determines the user is 5 feet from a sawmill with wood dust. In this example, since the user is wearing protective eyewear, contextual image modification program determines a lower priority score than if a user was not wearing protective eyewear. In an embodiment, contextual image modification program 101 generates a priority score based on the eye movement of the user. For example, if contextual image modification program 101 determines that a user is looking at the top left of their field of view, contextual image modification program 101 generates a higher priority score for objects in the top left of the user's field of view compared to the objects in the bottom right of the users field of view. In an embodiment, contextual image modification program 101 generates a priority score based on the visibility of the priority object. In an embodiment, the more unclear or blocked the priority object is from being visible, the higher the priority score assigned to the object. For example, if the priority object is obfuscated by fog, contextual image modification program 101 generates a high priority score for the priority object. In an embodiment, contextual image modification program 101 generates a degree of visibility based, at least in part, on the percentage of the priority object visible. In an embodiment, the lower the degree of visibility, the higher the priority score assigned to the object. In an embodiment, if a degree of visibility is below a predetermined threshold, contextual image modification program 101 generates a high priority score for the priority object. For example, if the priority object is 50% blocked by a secondary object, contextual image modification program 101 generates a high priority score for the priority object.

In an embodiment, contextual image modification program 101 updates or alters the priority score based on a change in the user's environment or change in the user's field of view. For example, if the user changes focus from the top left to the top right of their field of view, contextual image modification program 101 lowers the priority score for the objects in the top left and increases the priority score for objects in the top right of their field of view. In another example, if the priority object is a motor and is originally partially blocked by another object, such as a radiator, and the radiator is later removed by the user, contextual image modification program 101 lowers the priority score of the priority object based on the increased visibility thereof.

In an embodiment, contextual image modification program 101 selects a policy, based, at least in part, on comparing a classification of an object to one or more object modification policies associated with the use. For example, if contextual image modification program 101 detects a saw mill, contextual image modification program 101 selects a modification policy based on the classification of "sharp objects." In an embodiment, contextual image modification program 101 selects a policy, based, at least in part, on the particular contextual environment of the user, the particular objects and priority scores assigned to objects detected in the contextual environment, and information included in a user profile. In an embodiment, a particular policy is selected based, at least in part, on matching one or more of the distance between the priority object and the user, the motion of the priority object, the precautions the user has taken, the users occupation, the users preferences, the type of priority object, and the priority object score to a policy.

In an embodiment, contextual image modification program 101 modifies one or more objects based, at least in part, on the priority score. In an embodiment, contextual image modification program 101 modifies an object detected within the user's field of view based, at least in part, on the priority score of the object. In an embodiment, contextual image modification program 101 modifies an object detected within the user's field of view based, at least in part, on the modification policy selected. For example, if the selected modification policy indicates removing an object from the users point of view, contextual image modification program 101 removes the object from the users point of view. In an embodiment, contextual image modification program 101 modifies one or more objects in an AR environment or VR environment utilizing a GAN. In an embodiment, contextual image modification program 101 utilizes a trained GAN to modify one or more priority objects based on the priority score to provide better visibility of one or more priority objects to the user. In an embodiment, the GAN network generates an image that the lower priority objects are blurred or removed. In an embodiment, an augmented border is overlaid, via augmented reality, around the lower priority objects to indicate their presence without obstructing view of the priority object. For example, contextual image modification program 101 recreates an image by removing a low priority object that is blocking a high priority and indicates the low priority object by a dashed border to give better visibility to an object of higher priority.

In an embodiment, contextual image modification program 101 removes an object from the user's field of view within the augmented reality environment based, at least in part on, determining that a priority score of the object is below a predetermined threshold. For example, if out of 10 the predetermined threshold to remove an object is a priority score of 4 or lower, contextual image modification program 101 removes an object from the user's field of view within the augmented reality environment for any object with a priority score of 4 or lower.

In an embodiment, contextual image modification program 101 removes an object from the user's field of view within the augmented reality environment based, at least in part on, determining that a priority score of the object is above a predetermined threshold. For example, if out of 10 the predetermined threshold to remove an object is a priority score of 7 or higher, contextual image modification program

101 removes an object from the user's field of view within the augmented reality environment for any object with a priority score of 7 or higher.

In an embodiment, contextual image modification program 101 and the GAN generate a portion of a high priority object or entirely recreates a high priority object that cannot clearly be seen in the user's field of view. For example, a portion of a high priority object that is blocked or obscured from the user's view is recreated based on the characteristics of the portion of the high priority that is visible to the user. In an embodiment, contextual image modification program 101 determines from a partial view of the obscured object what the obscured object is as a whole. For example, from a partial view of a lamp blocked by a sofa, contextual image modification program 101 is able to determine the obscured object is a lamp.

In an embodiment, contextual image modification program 101 regenerates the image based on a context of the user (e.g., a particular activity being performed by the user) and identifying comparative priority of different objects. In an embodiment, contextual image modification program 101 utilizes a trained GAN to regenerate the image to show a high priority object clearly and makes a low priority object transparent. In an embodiment, contextual image modification program 101 compares two objects overlapping one another and determines the one with a higher priority score is more important than the object with a lower priority score. For example, if object A with a priority score of 5 is overlapping object B with a priority score of 7, contextual image modification program 101 determines object B is more important and utilizes a trained GAN to regenerate the image to show object B and remove object A.

In an embodiment, contextual image modification program 101 identifies precautions taken by the user while performing an activity in a particular context, and based on the level of precaution taken by the user, recalculates the priority score of different objects, and remodifies a particular object using a GAN. For example, if the user is wearing metal gloves, during that time, a rotating saw will not cause any problems. However, if the user takes the metal gloves off, contextual image modification program 101 increases the priority score associated with the object "rotating saw" and modifies the rotating saw blade using a GAN to clearly demonstrate to the user that the saw blade is moving.

In an example, multiple workers trained in different specializations are remodeling a house and each one of them focus on their area of specialty during the remodeling. Based on each worker's profile, contextual image modification program 101 generates the tools and items of each workers preference based on the workers background and specialty which were overlapping or not clear. Here the situational context varies based on the workers profile, occupation, background, specialty, and position. For example, an electrician is interested in viewing the wires and electric tools of the house while the painter is interested in viewing the paint, walls, and other painting materials for the house.

In another example, different users might be interested in viewing different content of the same video. Sometimes users do not want to see a specific content in a video. In such cases, where users of different profiles are gathered to view a common video, contextual image modification program 101 generates only the content that a user is interested in. For example, user A and user B are watching the same movie together while both wearing AR glasses and user A is scared of ghosts, while user B enjoys ghosts. In an embodiment, contextual image modification program 101 utilizes GAN enabled AR glasses to identify the object which is not of priority and hides it from the user who does not wish to witness it in a video. Here, contextual image modification program 101 generates a high priority score for the ghost for user A and generates a low priority score for user B based on the policy for each user and determined object. Contextual image modification program 101 determines the ghost in the movie is of high priority to user A and low priority to user B. In an embodiment, contextual image modification program 101 removes objects of high importance based, at least in part, on the users object preference profile. Contextual image modification program 101 regenerates the images in the movie to remove ghosts for user A. In an embodiment, contextual image modification program 101 overlays the background of the scene to remove one or more objects from a user's view. Here, contextual image modification program 101 selects a policy based on the context, priority level, priority object and overlays the background of the scene to remove the ghost from the users view. In an embodiment, contextual image modification program 101 generates, using a GAN, a portion of a background of the user's field of view corresponding to an area encompassed by the object and displays the generated portion of the background corresponding to the area encompassed by the object within the augmented reality environment. Here, contextual image modification program 101 generates a portion of the background corresponding to the area encompassing the object and displays the generated portion over the object of the ghost in order to block the ghost form the users field of view. In another embodiment, contextual image modification program 101 selects a different policy based on the context, priority level, priority object and overlays a different object over the priority object to remove one or more objects from user A's view. Here, contextual image modification program 101 overlays an image of a puppy to remove the ghost from the user A's view. However, contextual image modification program 101 does not regenerate the image for user B because based on user B's user profile user B prefers to see ghosts. Meaning, user A skips seeing a specific content (ghost) as per their profile's preference.

In an embodiment, contextual image modification program 101 determines the priority object is partially blocked and modifies the image by overlaying the blocked portion of the object so that it is visible to the user. For example, a high priority object is given a high priority score based on the type of object and user profile, but the high priority object is blocked by a lower priority object. Here, contextual image modification program 101 overlays the blocked portion of the high priority object so that it is visible to the user.

Figure 2:
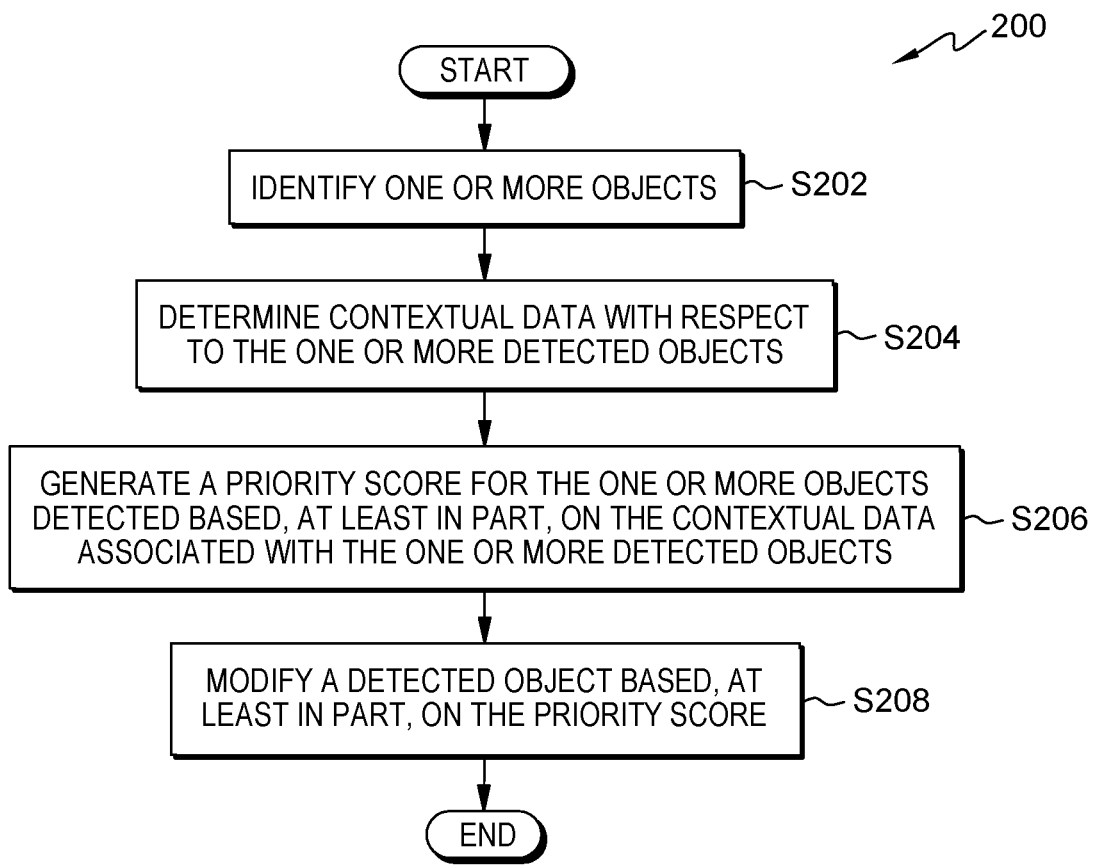
FIG. 2 is a flow chart diagram depicting operational steps for contextual image modification program 101, generally designated 200, in accordance with at least one embodiment of the present invention.

FIG. 2 is a flow chart diagram depicting operational steps for contextually regenerating multimedia based on context, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, contextual image modification program 101 identifies one or more objects. In an embodiment, contextual image modification program 101 identifies one or more objects by video content analysis, video content analytics, object analysis, or video motion analysis. In an embodiment, contextual image modification program 101 identifies one or more objects in a digital image, video, AR environment, or VR environment.

At step S204, contextual image modification program 101 determines contextual data with respect to the one or more detected objects. In an embodiment, contextual image modification program 101 determines the context of the digital image, video, AR environment, or VR environment based on the one or more determined objects. In an embodiment, contextual image modification program 101 determines contextual data based, at least in part, on the position, direction, area, location, visibility, movement, activity area, other detected objects, and location of where the user is focusing. In an embodiment, contextual image modification program 101 determines contextual data based, at least in part, on the user profile.

At step S206, contextual image modification program 101 generates a priority score for the one or more objects detected based, at least in part, on the contextual data associated with the one or more detected objects. In an embodiment, contextual image modification program 101 generates a priority score based, at least in part, on the user profile. In an embodiment, contextual image modification program 101 generates a priority score based on the one or more dangers detected and precautions taken by the user. For example, if the user has taken a precaution against the danger, contextual image modification program 101 lowers the priority score. In an embodiment, contextual image modification program 101 generates a priority score based on the eye movement of the user. In an embodiment, contextual image modification program 101 generates a priority score based on the visibility of the priority object. For example, if the priority object has a low visibility, contextual image modification program 101 generates a high priority score for the priority object.

At step S208, contextual image modification program 101 modifies a detected object based, at least in part, on the priority score. In an embodiment, contextual image modification program 101 regenerates the image based on user's context of the activity, identifying comparative priority of different objects. In an embodiment, contextual image modification program 101 modifies an object detected within the user's field of view based, at least in part, on the modification policy selected. In an embodiment, contextual image modification program 101 utilizes the GAN to regenerate the image to show a comparative priority object clearly and makes a comparatively less priority object transparent.

FIG. 3 is a block diagram depicting components of a computing device, generally designated 300, suitable for contextual image modification program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes contextual image modification program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile computer readable storage media.

Program instructions for contextual image modification program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
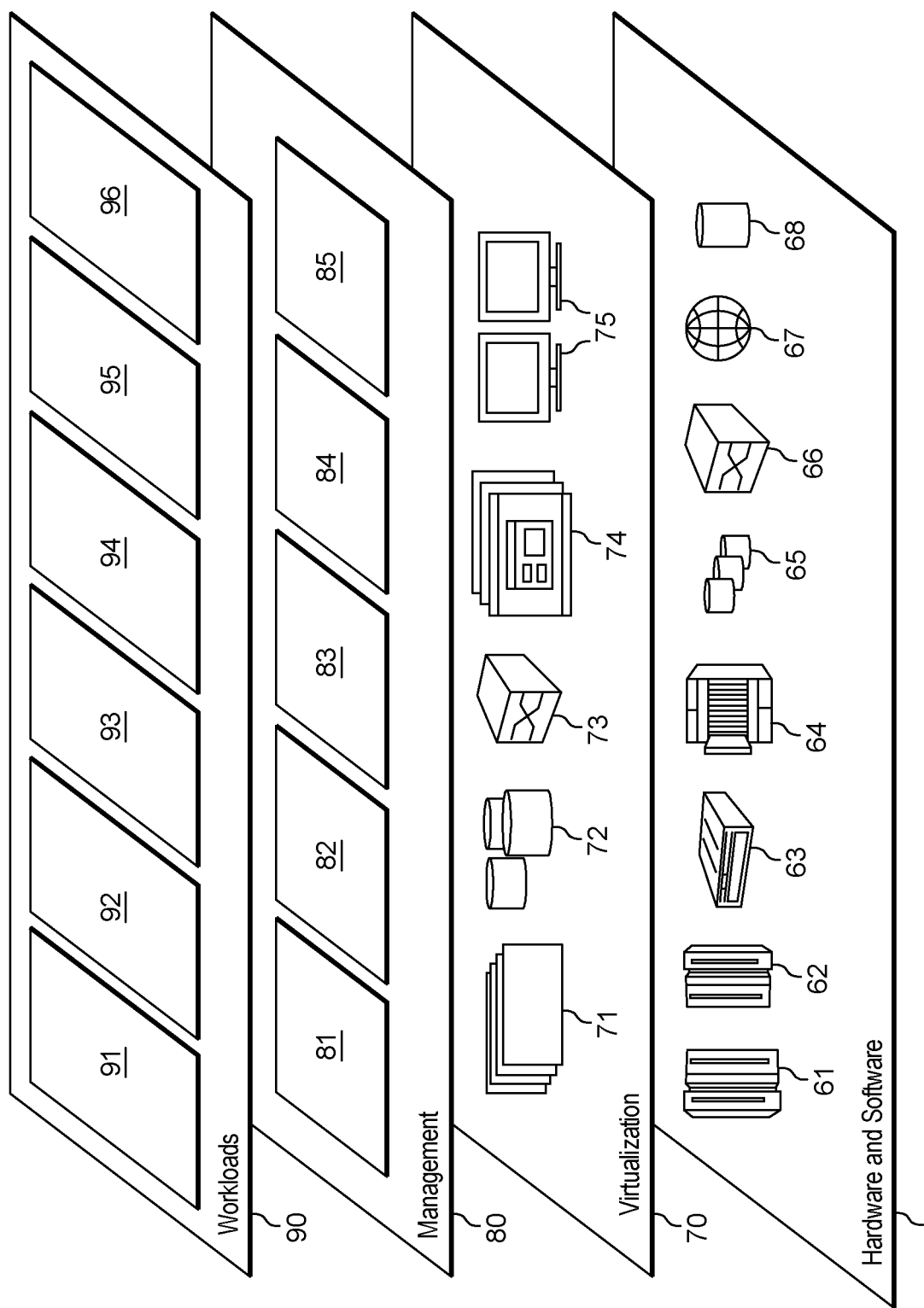
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual image regenerator 96.

What is claimed is:

1. A computer-implemented method for multimedia modification, the computer-implemented method comprising:
   classifying one or more objects detected within a user's field of view through an augmented reality environment;
   determining a context of the user based, at least in part, on the one or more classified objects detected within the user's field of view;
   generating a priority score for the one or more classified objects based, at least in part, on the context of the user and a precaution taken by the user in the context;
   modifying an object detected within the user's field of view based, at least in part, on the priority score of the object; and
   contextually prioritizing the one or more classified objects based, at least in part, on the priority score to regenerate an image showing a high priority object.

2. The computer-implemented method of claim 1, wherein modifying an object detected within the user's field of view includes:
   determining that a priority score of the object is below a predetermined threshold; and
   removing the object from the user's field of view within the augmented reality environment.

3. The computer-implemented method of claim 2, wherein removing the object from the user's field of view further includes:
   generating, using a generative adversarial network, a portion of a background of the user's field of view corresponding to an area encompassed by the object; and
   displaying the generated portion of the background corresponding to the area encompassed by the object within the augmented reality environment.

4. The computer-implemented method of claim 1, wherein modifying an object detected within the user's field of view includes:
   determining that a priority score of the object is above a predetermined threshold;
   determining that a portion of the object is blocked from the user's view by another object having a priority score below the predetermined threshold;
   generating, using a generative adversarial network, the portion of the object blocked from the user's view; and
   displaying the generated portion of the object blocked from the user's view within the augmented reality environment.

5. The computer-implemented method of claim 1, wherein modifying an object detected within the user's field of view is further based, at least in part, on:
   comparing a classification of the object to object modification policies associated with the user; and
   selecting one of the object modification policies based on the context of the user and the priority score of the object.

6. The computer-implemented method of claim 1, wherein generating a priority score for the one or more classified objects is further based, at least in part, on one or more of: a distance between a classified object and the user, a degree of visibility of an object, a detected motion of an object relative to the user, a perceived danger associated with an object, or one or more detected precautions taken by the user with respect to a classified object.

7. The computer-implemented method of claim 1, wherein an object is modified within the augmented reality environment using a generative adversarial network.

8. A computer program product for multimedia modification, the computer program product comprising one or more computer readable storage media and program instructions stored on the one or more computer readable storage media, the program instructions including instructions to:
   classify one or more objects detected within a user's field of view through an augmented reality environment;
   determine a context of the user based, at least in part, on the one or more classified objects detected within the user's field of view;
   generate a priority score for the one or more classified objects based, at least in part, on the context of the user and a precaution taken by the user in the context;
   modify an object detected within the user's field of view based, at least in part, on the priority score of the object; and
   contextually prioritize the one or more classified objects based, at least in part, on the priority score to regenerate an image showing a high priority object.

9. The computer program product of claim 8, wherein the instructions to modify an object detected within the user's field of view includes instructions to:
   determine that a priority score of the object is below a predetermined threshold; and
   remove the object from the user's field of view within the augmented reality environment.

10. The computer program product of claim 9, wherein the instructions to remove the object from the user's field of view further includes instructions to:
    generate, using a generative adversarial network, a portion of a background of the user's field of view corresponding to an area encompassed by the object; and
    display the generated portion of the background corresponding to the area encompassed by the object within the augmented reality environment.

11. The computer program product of claim 8, wherein the instructions to modify an object detected within the user's field of view includes instructions to:
    determine that a priority score of the object is above a predetermined threshold;
    determine that a portion of the object is blocked from the user's view by another object having a priority score below the predetermined threshold;

generate, using a generative adversarial network, the portion of the object blocked from the user's view; and display the generated portion of the object blocked from the user's view within the augmented reality environment.

12. The computer program product of claim 8, wherein the instructions to modify an object detected within the user's field of view is further based, at least in part, on instructions to:

compare a classification of the object to one or more object modification policies associated with the user.

13. The computer program product of claim 8, wherein the instructions to generate a priority score for the one or more classified objects is further based, at least in part, on one or more of: a degree of visibility of an object, a detected motion of an object relative to the user, a perceived danger associated with an object, or one or more detected precautions taken by the user with respect to a classified object.

14. The computer program product of claim 8, wherein an object is modified within the augmented reality environment using a generative adversarial network.

15. A computer system for multimedia modification, comprising:

one or more computer processors;

one or more computer readable storage media;

computer program instructions;

the computer program instructions being stored on the one or more computer readable storage media for execution by the one or more computer processors; and the computer program instructions including instructions to:

classify one or more objects detected within a user's field of view through an augmented reality environment;

determine a context of the user based, at least in part, on the one or more classified objects detected within the user's field of view;

generate a priority score for the one or more classified objects based, at least in part, on the context of the user and a precaution taken by the user in the context;

modify an object detected within the user's field of view based, at least in part, on the priority score of the object; and contextually prioritize the one or more classified objects based, at least in part, on the priority score to regenerate an image showing a high priority object.

16. The computer system of claim 15, wherein the instructions to modify an object detected within the user's field of view includes instructions to:

determine that a priority score of the object is below a predetermined threshold; and remove the object from the user's field of view within the augmented reality environment.

17. The computer system of claim 16, wherein the instructions to remove the object from the user's field of view further includes instructions to:

generate, using a generative adversarial network, a portion of a background of the user's field of view corresponding to an area encompassed by the object; and display the generated portion of the background corresponding to the area encompassed by the object within the augmented reality environment.

18. The computer system of claim 15, wherein the instructions to modify an object detected within the user's field of view includes instructions to:

determine that a priority score of the object is above a predetermined threshold;

determine that a portion of the object is blocked from the user's view by another object having a priority score below the predetermined threshold;

generate, using a generative adversarial network, the portion of the object blocked from the user's view; and display the generated portion of the object blocked from the user's view within the augmented reality environment.

19. The computer system of claim 15, wherein the instructions to modify an object detected within the user's field of view is further based, at least in part, on instructions to:

compare a classification of the object to one or more object modification policies associated with the user.

20. The computer system of claim 15, wherein the instructions to generate a priority score for the one or more classified objects is further based, at least in part, on one or more of: a distance between a classified object and the user, a degree of visibility of an object, a detected motion of an object relative to the user, a perceived danger associated with an object, or one or more detected precautions taken by the user with respect to a classified object.

* * * * *